United States Patent
Jose et al.

(10) Patent No.: US 10,725,767 B2
(45) Date of Patent: Jul. 28, 2020

(54) SYSTEMS AND METHODS FOR REINFORCED UPDATE PACKAGE AUTHENTICITY

(71) Applicant: DELL PRODUCTS, LP, Round Rock, TX (US)

(72) Inventors: Cyril Jose, Austin, TX (US); Akshata Sheshagiri Naik, Pflugerville, TX (US); Balaji Bapu Gururaja Rao, Austin, TX (US); Raveendra Babu Madala, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/160,380

(22) Filed: Oct. 15, 2018

(65) Prior Publication Data

US 2020/0117439 A1 Apr. 16, 2020

(51) Int. Cl.
  *G06F 8/65* (2018.01)
  *G06F 21/64* (2013.01)
  *H04L 9/32* (2006.01)

(52) U.S. Cl.
  CPC ............. *G06F 8/65* (2013.01); *G06F 21/64* (2013.01); *H04L 9/3247* (2013.01)

(58) Field of Classification Search
  CPC ........... G06F 8/65; G06F 21/64; H04L 9/3247
  USPC .................................................. 717/168–173
  See application file for complete search history.

(56) References Cited

U.S. PATENT DOCUMENTS

| | | | | |
|---|---|---|---|---|
| 2006/0168574 | A1* | 7/2006 | Giannini | G06F 8/65 717/168 |
| 2009/0260004 | A1* | 10/2009 | Datta | G06F 8/65 717/175 |
| 2010/0175116 | A1* | 7/2010 | Gum | G06F 21/31 726/6 |
| 2013/0318357 | A1* | 11/2013 | Abraham | G06F 21/57 713/176 |
| 2015/0378715 | A1* | 12/2015 | Solnit | G06F 8/65 713/2 |

(Continued)

OTHER PUBLICATIONS

"The Biggest Cybersecurity Threats Are Inside Your Company," Marc van Zadelhoff; Harvard Business Review; Sep. 19, 2016; pp. 1-4; https://hbr.org/2016/09/the-biggest-cybersecurity-threats-are-inside-your-company.

(Continued)

*Primary Examiner* — Qing Chen
(74) *Attorney, Agent, or Firm* — Larson Newman, LLP

(57) ABSTRACT

A system for ensuring update package authenticity includes an update package transaction ledger and a repository. Change managers are configured to maintain the update package transaction ledger, create a transaction block using metadata of an update, and determine a package value based on the transaction ledger and on the update. The change managers also incorporate the package value and the update into a package, and upload the package to the repository. A client obtains the package from the repository, obtains the transaction block from the update package transaction ledger, determines a calculated value based on the transaction block and on the update, and compares the calculated value and the package value. The update is installed when the calculated value and the package value match.

16 Claims, 5 Drawing Sheets

(56) References Cited

U.S. PATENT DOCUMENTS

| | | | |
|---|---|---|---|
| 2016/0253170 A1* | 9/2016 | Fardig | G06F 8/658 |
| | | | 717/170 |
| 2016/0300222 A1 | 10/2016 | Yang | |
| 2017/0372417 A1* | 12/2017 | Gaddam | G06Q 20/065 |
| 2018/0048473 A1* | 2/2018 | Miller | G06F 8/65 |
| 2020/0073651 A1* | 3/2020 | Rodriguez Bravo | H04W 4/40 |

OTHER PUBLICATIONS

Bitcoin: A Peer-to-Peer Electronic Cash System; Satoshi Nakamoto; 2008; pp. 1-9; https://bitcoin.org/bitcoin.pdf.

* cited by examiner

SYSTEMS AND METHODS FOR REINFORCED UPDATE PACKAGE AUTHENTICITY

FIELD OF THE DISCLOSURE

The present disclosure generally relates to information handling systems, and more particularly relates to reinforced update package authenticity.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system for ensuring update package authenticity includes an update package transaction ledger and a repository. Change managers may maintain the update package transaction ledger, create a transaction block using metadata of an update, and determine a package value based on the transaction ledger and on the update. The change managers also may incorporate the package value and the update into a package, and upload the package to the repository. A client obtains the package from the repository, obtains the transaction block from the update package transaction ledger, determines a calculated value based on the transaction block and on the update, and compares the calculated value and the package value. The update is installed when the calculated value and the package value match.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
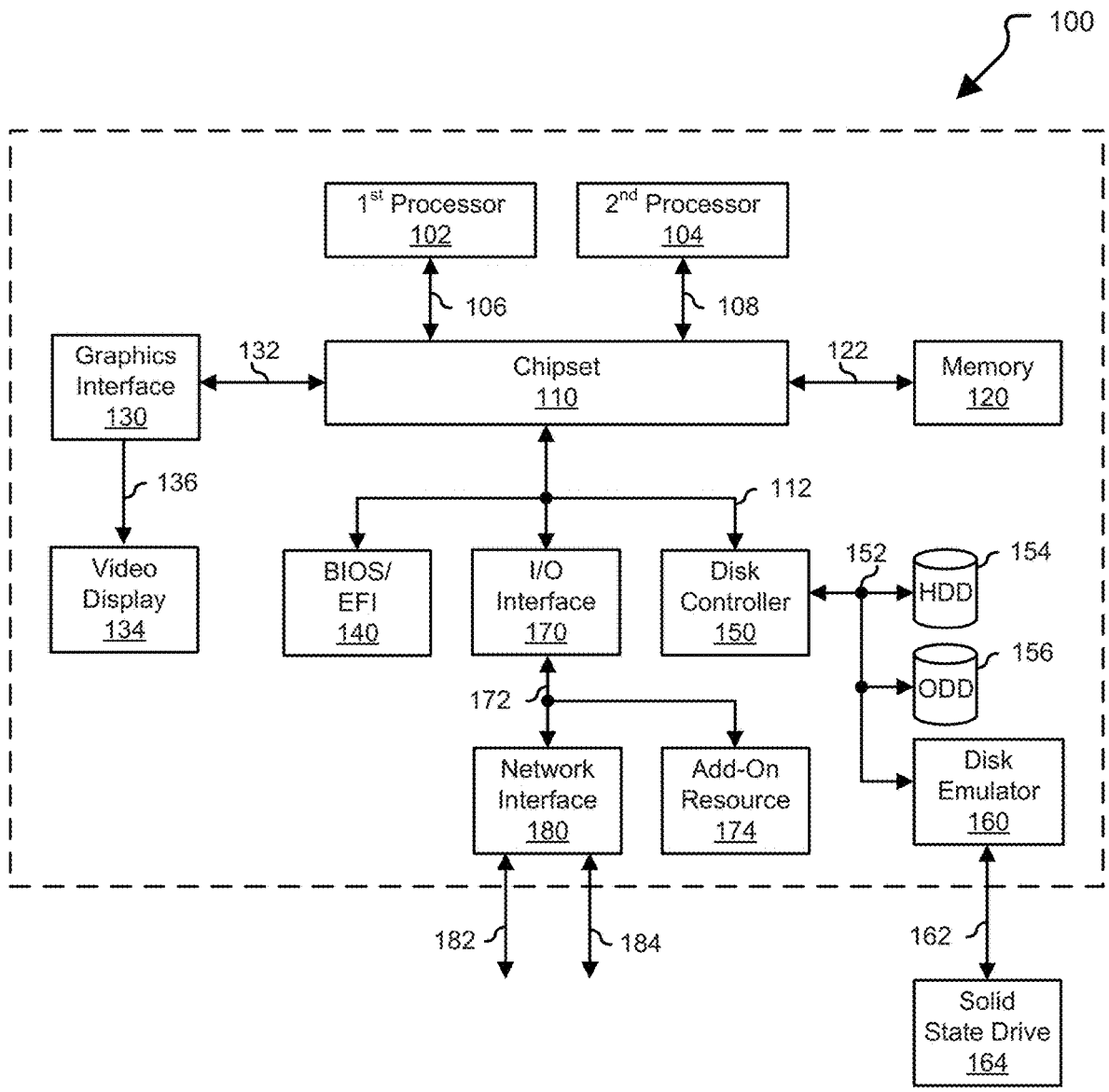
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

A package updater can enable easy updates, such as firmware updates or software updates, for system components. A change management team at the equipment provider can provide a framework which facilitates the system component teams to create update packages. A server administrator user can obtain the update package from a support website or other sources to apply the updates directly from operating systems or through managed applications and consoles.

Authenticity of the obtained update package can be critical to ensure the firmware or software to be installed on the system is not compromised. Update package contents can be signed and signature can be verified using a published certificate before installation to validate the package authenticity. However, if the private key used for signing the package itself is compromised, an imposter can create and share malicious packages which can put user's system and data at risk. Securing a private key wallet necessarily has all the challenges of securing a real world physical safety deposit locker and can be susceptible to most common types of security breach including those originating from insider involvement.

In various embodiments, a decentralized permissioned distributed update package tracking ledger can record each valid update package creation as a transaction. Read operation in to the ledger can be open and shall be available for read at a highly available published address space. Write operation can be authenticated and can be initiated by only valid peer change management nodes. A measurement value derived from the transaction details at the tacking ledger can be added in to the update package in addition to the existing signature. The permissioned transaction ledger can be maintained by designated nodes which are authorized to do so in the interest of the organization. Rather than a proof of work to add a new transaction record to the blockchain, the addition of a transaction record depends on the consensus of the authorized peers and an update package creation event from a change management engineer to build or contribute towards the chain.

The disclosed method can reinforce security of the update packages and can facilitate a repository manager to verify against spoofing, masquerade, and other threats even in the event of key compromise. In addition to verifying the signature, an update application can verify the included measurement value by comparing the one in the package with one that can be generated at the spot from the transaction record published in the transaction ledger. The update package can be considered authentic only when the signature and the measurement value can be verified.

Figure 2:
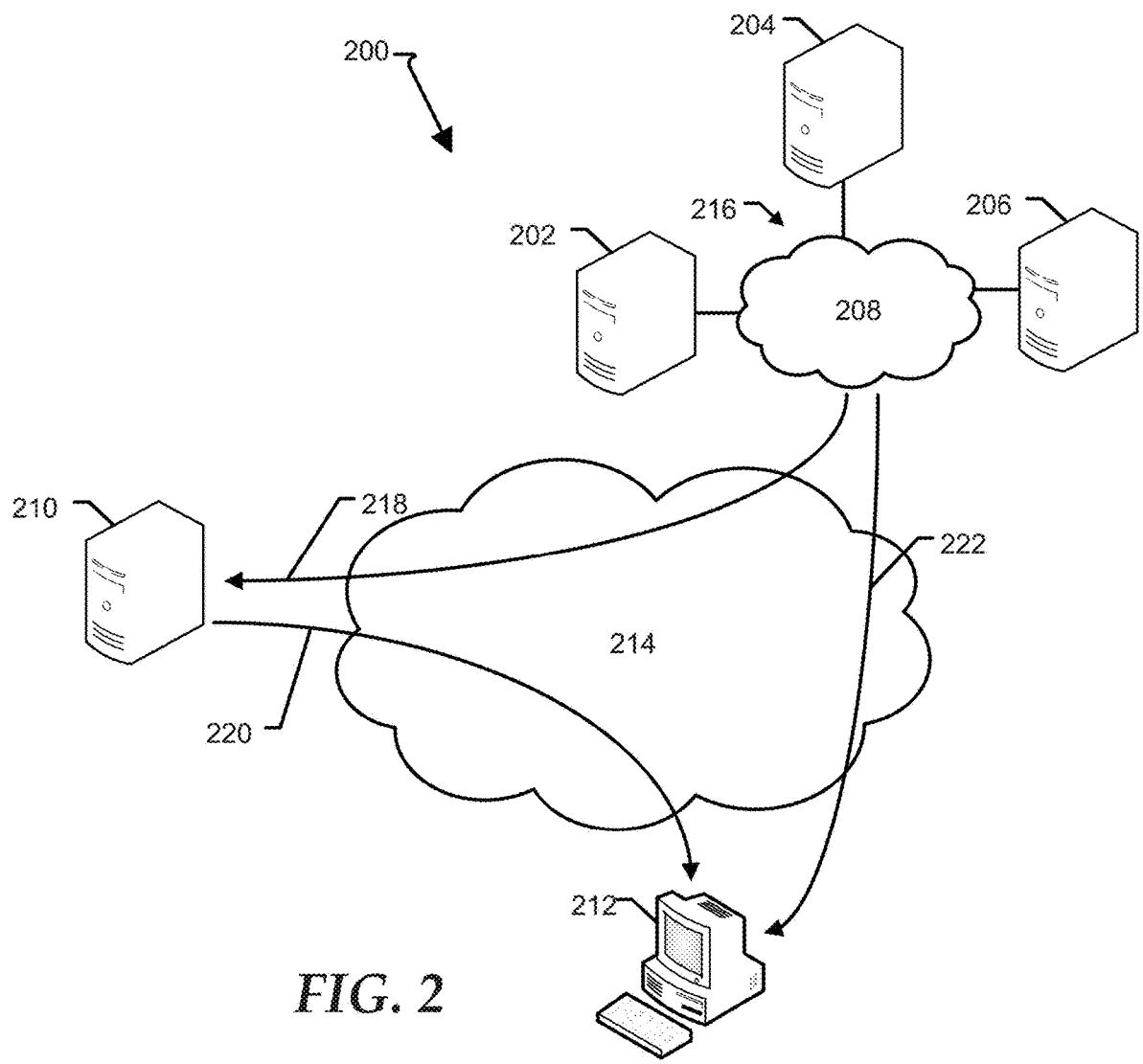
FIG. 2 is a schematic diagram illustrating an exemplary system for authenticating update packages.

FIG. 2 shows a system for authenticating an update package. The system can include change managers 202, 204, and 206, an update package transaction ledger 208, an update repository 210, a client system 212. Change managers 202, 204, and 206, update repository 210, and client system 212 can be linked by network 214.

The change mangers 202, 204, and 206 can form a private, authenticated, distributed peer-to-peer network which can maintain the update package transaction ledger 208. The update package transaction ledge 208 can be a distributed blockchain register that is maintained by the change managers 202, 204, and 206. The update package transaction ledger 208 can be widely available for read access but additions to the blockchain can be limited to only the change managers 202, 204, and 206.

When an update is created, as indicated by arrow 216, the changes managers 202, 204, and 206 can add a transaction record for the update to the update package transaction ledger 208. The update can then be provided to the update repository 210, as indicated by arrow 218. The client can retrieve the update from the update repository (indicated by arrow 220) and the transaction record from the update package transaction ledger 208 (indicated by arrow 222). By comparing the update package and the transaction record, client system 212 can authenticate the update and ensure the update has not been tampered with, such as by incorporating malicious code. In various embodiments, the update repository 210 can store a copy of the update package transaction ledger and provide the transaction record to the client system along with the update package.

In various embodiments, the update repository can be a highly available global update repository maintained by the update provider that can be accessed by client systems throughout the world or a geographic region. In other embodiments, the update repository can be maintained by an organization with a large number of client systems. The organization can manage the update process and reduce external network traffic by storing copies of the updates locally. In particular embodiments, the update repository 210 may also verify the update before making it available to client systems.

Figure 3:
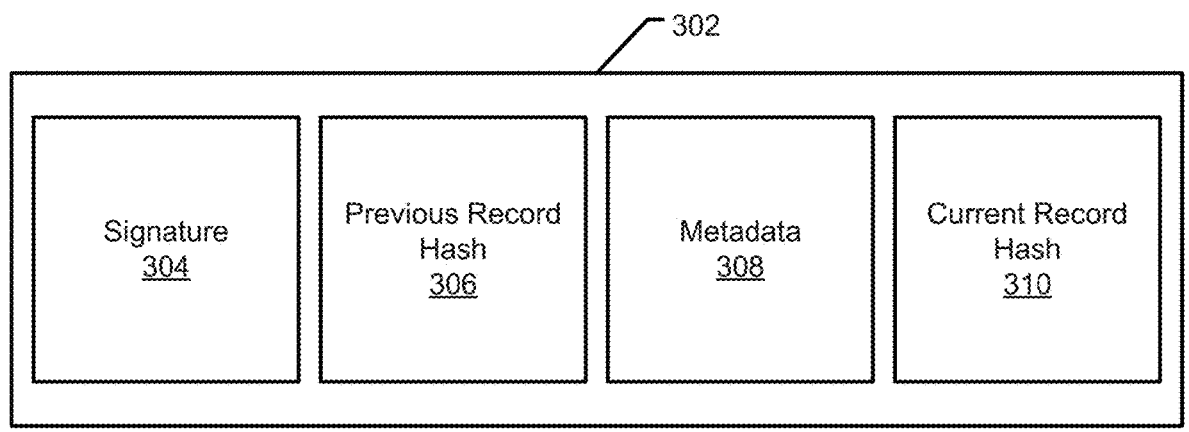
FIG. 3 is a block diagram illustrating an exemplary embodiment of an update transaction record.

FIG. 3 illustrates the structure of an exemplary transaction record 302. Transaction record 302 can include a signature 304, a previous record hash 306, package metadata 308, and a current record hash 310. Signature 304 can include information used to ensure the update has not been modified. Signature 304 can be a cryptographic signature of the update signed with a private key but capable of verification by a public key. Alternatively, signature 308 can be a hash or other function of the update that can be used to identify a change to the update.

Metadata 308 can include package specific data, a timestamp corresponding to when the package was created, information identifying the team responsible for creation of the update, identifying information about the system component the update relates to, or any combination thereof. The metadata 308 can be included in the update in an encoded or compressed fashion to reduce the space required to store the metadata 308.

Previous record hash 306 and current record hash 310 can include a hash or similar function of the contents of the current or previous record. The previous record hash 306 and current record hash 310 can be used to verify the integrity of the blockchain. For example, if a transaction record 302 were altered, the previous record hash 306 of a subsequent transaction record would not match the current record hash 310 of the tampered transaction record 302 or the hash of the altered record would not match the information stored in the current record hash 310. Thus, alteration of any record in the blockchain would require modification of every subsequent record in the blockchain. Additionally, since the blockchain is maintained by a peer-to-peer network of change managers, alteration of the blockchain would require alteration by a majority of the change managers.

Figure 4:
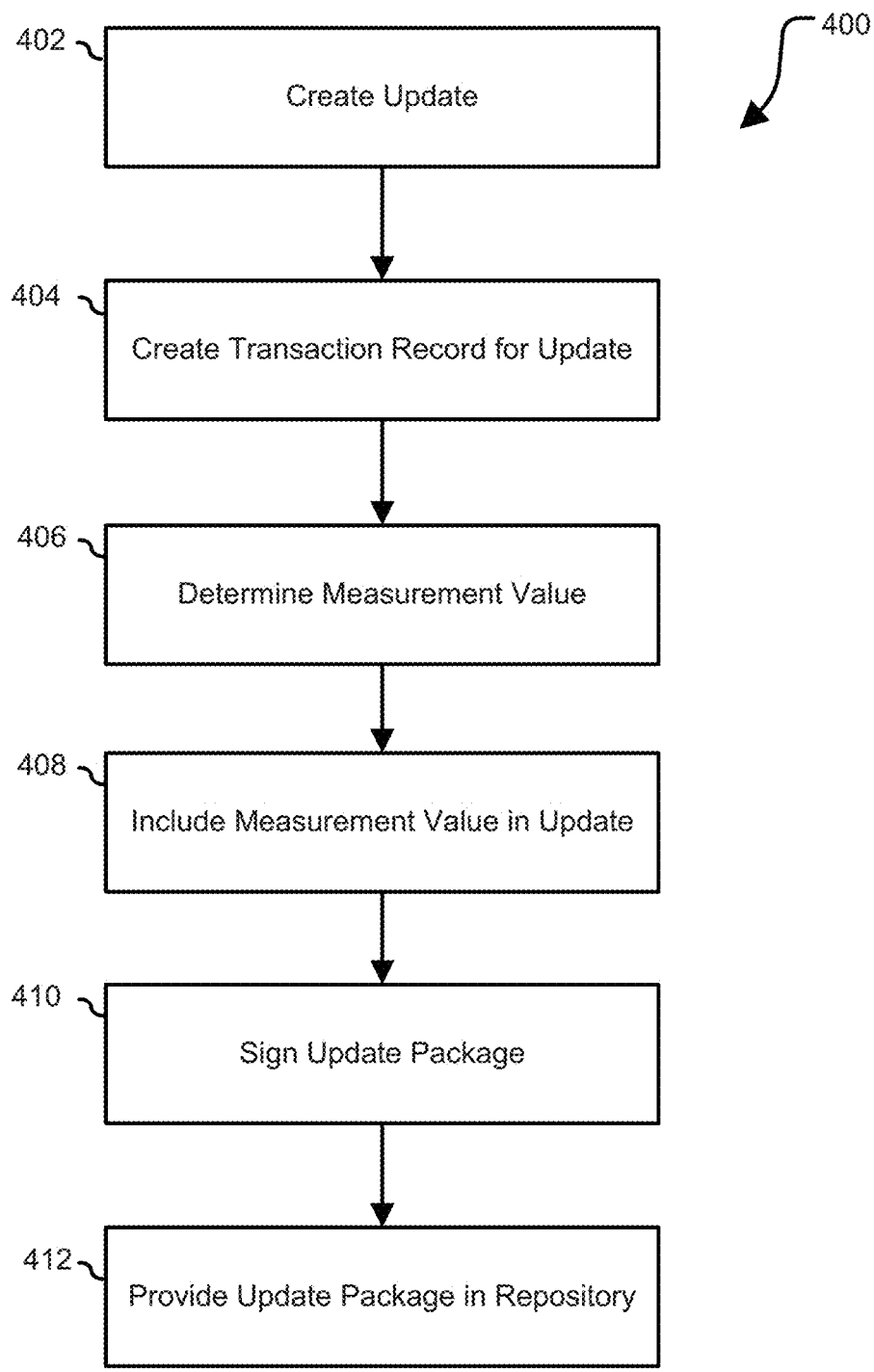
FIG. 4 is a flow diagram illustrating an exemplary method of making an update available.

FIG. 4 illustrates a method 400 of providing an update. At 402, the update is created. For example, the system, such as at the change manager, can compile the update. Additionally, various checks can be performed to ensure the update is not compromised. These checks can include code checks, such as scanning the update for signatures of malicious code, and procedural checks, such as verifying signoff by appropriate stake holders, such as testing leads, development leads, and management. Additionally, the update metadata can be checked for correctness. For example, if the team responsible for the update does not correspond to the system component being updated, the update can be rejected.

At 404, a transaction record can be created in the update package ledger. The transaction block can be created by compressing or encoding the metadata, calculating a signature for the update, and obtaining a hash of the previous transaction record. The metadata, signature, and previous record hash can be combined and a hash calculated and added to the transaction block as a current record hash.

At 406, a measurement value can be calculated based on the transaction record and the update. For example, the transaction block and the update can be concatenated and a hash is calculated. In another example, a hash of the transaction block, such as the current record hash or another hash, and a hash or checksum of the update can be mathematically or logically combined to obtain the measurement value. In particular embodiments, the measurement value can be calculated as mv(DUP)=p*value1*value 2, where value 1 is the transaction hash, value 2 is the update package checksum, and p is a large prime number.

At 408, the measurement value can be included in the update package. At 410, the update package can be cryptographically signed, and at 412, the update package can be provided in the update repository.

Figure 5:
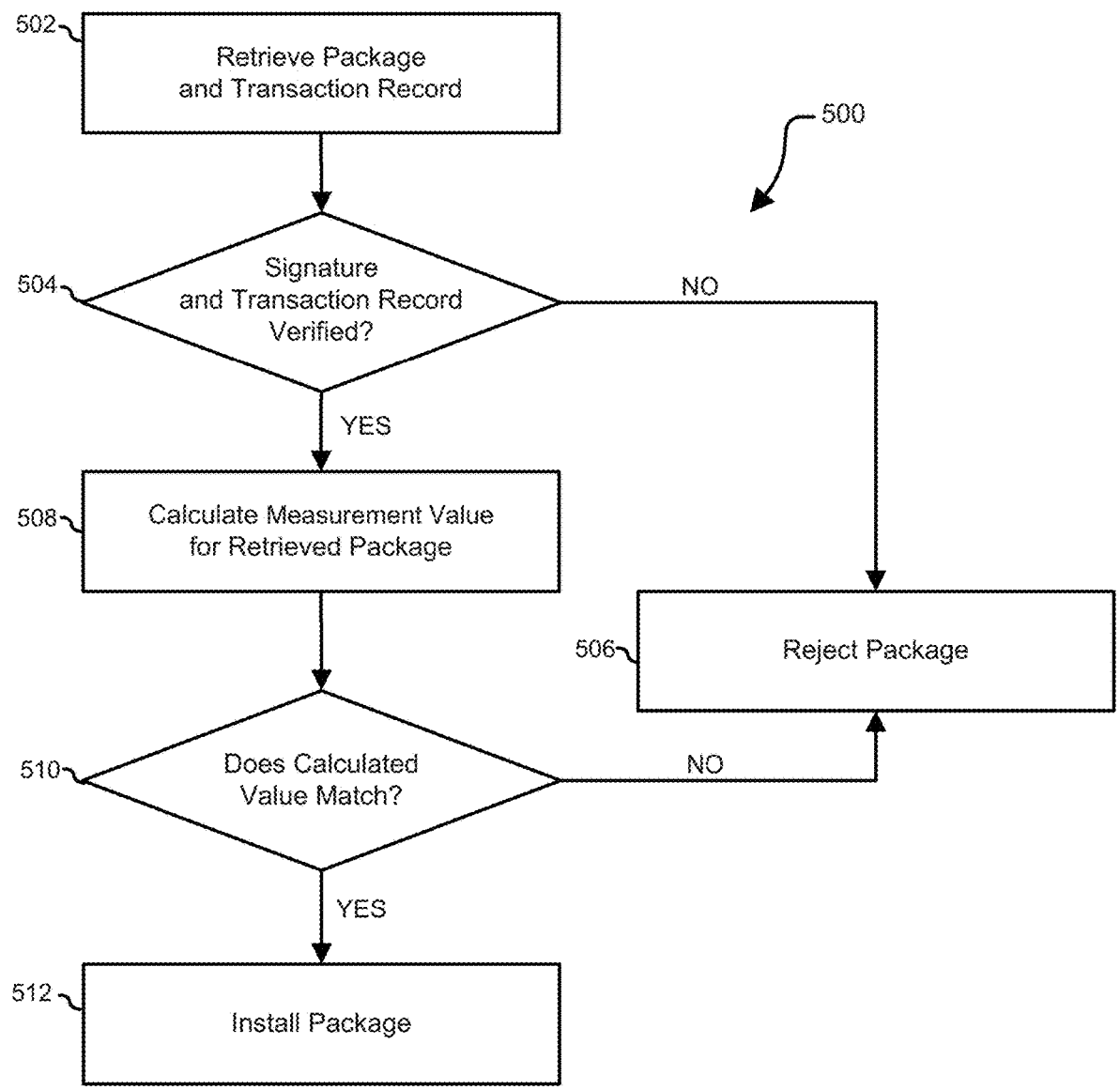
FIG. 5 is a flow diagram illustrating an exemplary method of verifying the authenticity of an update package.

FIG. 5 illustrates a method 500 of receiving an update. At 502, the update package and the transaction block corresponding to the update package can be retrieved. At 504, the transaction record and the signature can be verified. For example, the transaction record can be verified by comparing the previous record hash in the transaction record to a hash of the previous ledger, the current record hash in the transaction record can be compared to a hash of the transaction record, and the previous record hash of a next transaction record can be compared to a hash of the transaction record. Additionally, the signature can be verified through the use of a public key and comparison to the update package. If one or more of these checks fail, the package can be rejected at 506.

Alternatively, if all the checks pass, a measurement value can be calculated from the transaction record and the retrieved update package at 508. At 510, the calculated measurement value can be compared to the measurement value included in the update package. If the measurement values do not match, the update package can be rejected at 506. Alternatively, when the measurement values do match, the update package can be installed at 512.

In various embodiments, when the update package is rejected, the package can be discarded, the user can be notified of a failed update, the repository can be notified of a corrupt package, the update package can be download from an alternate repository and the verification process repeated, or any combination thereof.

The disclosed system and methods can improve the security and operation of an information handling system.

Verification of the measurement value provides an additional layer of authentication to protect from a compromise of the private key used to sign packages. Further, due to the decentralized and distributed ledger, modification of the ledger to insert a compromised transaction record would require compromising a majority of change management nodes, further minimizing the likelihood that a single actor or even a small group of actors to compromise the system.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for ensuring update package authenticity, comprising:
an update package transaction ledger to record valid update package creation events;
a repository including a storage;
a plurality of change managers forming a private, authenticated, and distributed peer-to-peer network, the plurality of change managers including processors configured to:
maintain the update package transaction ledger;
create an update;
determine that the update is not compromised;
create a transaction block in the update package transaction ledger for the update using metadata of the update;
determine a package value based on the transaction block in the update package transaction ledger and on the update;
incorporate the package value and the update into an update package; and
upload the update package to the repository; and
a client including a client storage and a client processor, the client processor configured to:
retrieve the update package from the repository;
obtain the transaction block from the update package transaction ledger for the update;
determine a calculated value based on the transaction block from the update package transaction ledger for the update and the update package;
compare the calculated value and the package value; and
install the update package when the calculated value and the package value match, otherwise reject the update package.

2. The system of claim 1, wherein the plurality of change managers are further configured to sign the update package prior to uploading the update package to the repository, and wherein the client is further configured to validate the signature of the update package prior to installing the update package.

3. The system of claim 1, wherein the transaction block in the update package transaction ledger includes a previous record hash, a current record hash, and package metadata.

4. The system of claim 3, wherein the package metadata includes a timestamp for the update, an identifier for the update, a checksum of the update, or any combination thereof.

5. The system of claim 1, wherein the client is further configured to discard the update package when the package value does not match the calculated value.

6. The system of claim 1, wherein the client is further configured to notify a user when the package value does not match the calculated value.

7. The system of claim 1, wherein the client is further configured to notify the repository when the package value does not match the calculated value.

8. The system of claim 1, wherein the client is further configured to retrieve the update package from an alternate repository when the package value does not match the calculated value.

9. A method of providing and installing an update, comprising:
configuring a plurality of change managers including processors forming a private, authenticated, and distributed peer-to-peer network to:
maintain an update package transaction ledger to record valid update package creation events;
create an update;
determine that the update is not compromised;

create a transaction block in the update package transaction ledger for the update using metadata of the update;

determine a package value based on the transaction block in the update package transaction ledger and on the update;

incorporate the package value and the update into an update package; and upload the update package to a repository; and configuring a client including a client storage and a client processor to:

retrieve the update package from the repository;

obtain the transaction block from the update package transaction ledger for the update;

determine a calculated value based on the transaction block from the update package transaction ledger for the update and the update package;

compare the calculated value and the package value; and install the update package when the calculated value and the package value match, otherwise reject the update package.

10. The method of claim 9, further comprising configuring the plurality of change managers to sign the update package prior to uploading the update package to the repository; and configuring the client to validate the signature of the update package prior to installing the update package.

11. The method of claim 9, wherein the transaction block in the update package transaction ledger includes a previous record hash, a current record hash, and package metadata.

12. The method of claim 11, wherein the package metadata includes a timestamp for the update, an identifier for the update, a checksum of the update, or any combination thereof.

13. The method of claim 9, further comprising configuring the client to discard the update package when the package value does not match the calculated value.

14. The method of claim 9, further comprising configuring the client to notify a user when the package value does not match the calculated value.

15. The method of claim 9, further comprising configuring the client to notify a repository when the package value does not match the calculated value.

16. The method of claim 9, further comprising configuring the client to retrieve the update package from an alternate repository when the package value does not match the calculated value.

* * * * *